United States Patent [19]

Ruter et al.

[11] 4,011,188
[45] Mar. 8, 1977

[54] POWDERY COATING COMPOSITION

[75] Inventors: Jörn Rüter, Marl; Heinz Scholten, Lippramsdorf, both of Germany

[73] Assignee: Chemische Werke Huls Aktiengesellschaft, Marl, Germany

[22] Filed: Nov. 14, 1975

[21] Appl. No.: 632,016

[30] Foreign Application Priority Data

Nov. 20, 1974 Germany .................... 2454880

[52] U.S. Cl. .................. 260/31.6; 260/32.6 R; 427/27; 427/185; 427/423; 428/458
[51] Int. Cl.$^2$ ................................ C08L 67/02
[58] Field of Search .............. 260/31.6, 32.6 R

[56] References Cited

UNITED STATES PATENTS

| | | | |
|---|---|---|---|
| 2,901,466 | 8/1959 | Kilber et al. ............... | 260/75 |
| 3,654,198 | 4/1972 | Hood et al. ................. | 260/16 |

*Primary Examiner*—Stanford M. Levin
*Attorney, Agent, or Firm*—Millen & White

[57] ABSTRACT

A powdery coating composition suitable for coating metallic surfaces at high temperatures, comprising powdery particles of a saturated, high-molecular weight thermoplastic polyester having an RSV value of about 0.4–1.2 dl./g. having homogeneously dispersed throughout said particles about 0.1–5% by weight, based on the weight of the polyester, of a flow agent of the formula

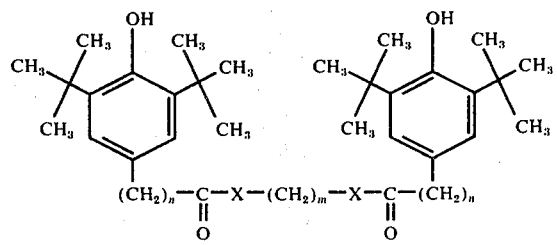

wherein
n is an integer of 0–6;
m is an integer of 2–12; and
X is oxygen or an —NH— group.

9 Claims, No Drawings

POWDERY COATING COMPOSITION

BACKGROUND OF THE INVENTION

This invention relates to powdery coating compositions suitable for high temperature coating of metallic surfaces comprising a saturated, high-molecular weight thermoplastic polyester binder and the customary auxiliary agents and additives, characterized by the addition of an improved flow agent.

Such coating compositions are utilized for the production of enamel-like coatings on metals in fluidized-bed coating, flame-spraying or electrostatic coating methods. The coatings are distinguished by high adhesion, good thermal and solvent stability, as well as excellent mechanical and electrical properties.

In practice, it has been found that such powdery coating compositions have several essential disadvantages in addition to their good properties. One of these disadvantages resides in poor flow characteristics during the coating process on a heated metallic substrate article, due to the relatively high melt viscosity of the polyester binders. Due to this fact, undulating surface coats are obtained; such an appearance is called the "orange-peel" effect.

This disadvantage can be avoided by adding to the coating composition flow agents which reduce the melt viscosity. Thus, in U.S. Pat. No. 3,654,198, cellulose esters and organic plasticizers are employed in combination to improve the flow properties. However, in order to obtain a sufficient effect, it is generally necessary to use relatively large amounts of the flow agent so that a marked impairment of the desirable properties necessary in enamel technology is encountered, e.g. an impairment of the elasticity. Besides, these additives have the disadvantage that they are decomposed and/or volatilized at the high temperatures employed in the coating step; this leads to the troublesome smoking phenomenon while the coating is being applied. The latter disadvantage especially must be avoided in view of the environmental protection regulations nowadays in existence.

Also, other high-molecular weight additives are known by means of which the flow of coating compositions which contain powdery, high-molecular weight polyester binders can be improved. For example, a technical leaflet from Dynamit Nobel A. G. describes acrylate resins as flow agents for the P 1300 type polyester. However, these products likewise tend toward smoking at the high processing temperatures employed in the production of enamel-like coatings.

OBJECTS OF THE INVENTION

Accordingly, it is a general object of the present invention to provide improved powdery coating compositions suitable for high temperature coating of metallic surfaces.

Another object of the present invention is to provide such coating compositions comprising a high-molecular weight thermoplastic polyester binder, optionally with customary auxiliary agents, admixed with a substantially smokeless flow enhancing agent.

A further object of the present invention is to provide such compositions which exhibit a combination of improved flow properties without smoking or fuming at high temperatures without impairment of the physical properties of the final enamel coating.

Upon study of the specification and appended claims, further objects and advantages of this invention will become apparent to those skilled in the art.

SUMMARY OF THE INVENTION

Briefly, the above and other objects are attained in one aspect of the present invention by providing a powdery coating composition suitable for coating metallic surfaces at high temperatures, comprising powdery particles of a saturated, high-molecular weight thermoplastic polyester having an RSV value of about 0.4–1.2 dl./g. having homogeneously dispersed throughout said particles about 0.1–5% by weight, based on the weight of the polyester, of a flow agent of the formula

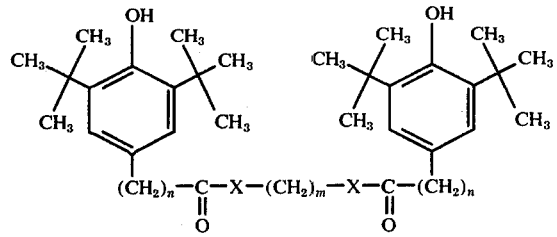

wherein $n$ is an integer of 0–6; $m$ is an integer of 2–12; and X is oxygen or an —NH— group.

DETAILED DISCUSSION

The flow agents of the present invention can be prepared by usual condensation reactions of aliphatic diols or diamins with 3,5-di-tert.-butyl-4-hydroxyphenyl-alkane carboxylic acids (mole ratio 1 : 2) at 150°– 200° C under elimination of water. Especially preferred flow agents of the above formula are those meeting one or more of the following criteria:

a. Compounds wherein $n$ is 0 – 4, especially 2 – 4;
b. Compounds wherein $m$ is an even integer, preferably of 2 – 12, and especially 6 – 12.
c. Compounds wherein X is NH.

Preferably 0.5–2% by weight of a compound of the general formula is utilized as the flow agent. Specifically, the compounds recited below are especially preferred as the flow agents:

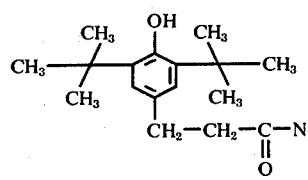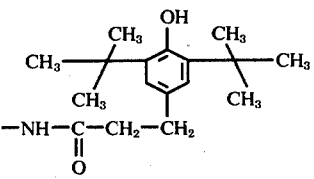

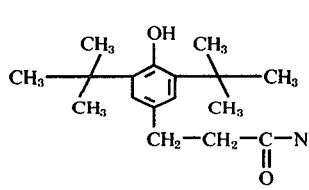 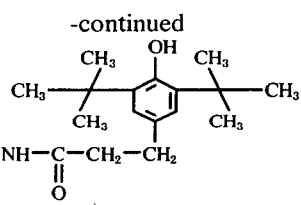

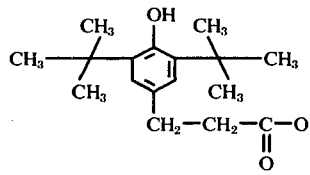 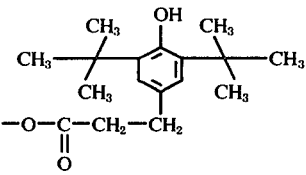

If the index n = 0, this means that the —(CH$_2$)— group is omitted; i.e. the carboxylate residue is directly linked to the phenyl residue.

The coating compositions of this invention contain, as the binders, linear, high-molecular weight thermoplastic polyesters. These polyesters contain in the dicarboxylic acid portion residues of terephthalic acid and another aromatic and/or cycloaliphatic dicarboxylic acid, e.g. isophthalic acid, naphthalene-1,5-dicarboxylic acid, naphthalene-2,6-dicarboxylic acid, hexahydroterephthalic acid, hexahydroisophthalic acid, etc. Furthermore, 0–40 molar percent of a linear aliphatic dicarboxylic acid can additionally be contained therein, e.g. adipic acid, azelaic acid, sebacic acid, decanedicarboxylic acid, etc. The diol component consists of aliphatic and/or cycloaliphatic diols, e.g. ethylene glycol, 1,2-propanediol, 1,3-propanediol, 1,4-butanediol, 1,6-hexanediol, neopentyl glycol, 1,4-bis-(hydroxymethyl)cyclohexane (CHDM), etc.

Especially suitable are those copolyesters containing, with respect to the acid component, substantially equal molar parts of terephthalic acid, on the one hand, and isophthalic acid or hexahydroterephthalic acid, on the other hand, wherein up to 10% of the terephthalic acid can be replaced by an aliphatic dicarboxylic acid, e.g. decanedicarboxylic acid, while the diol proportion is predominantly CHDM, preferably 100 molar percent of CHDM.

Within the scope of the present invention, no protection is being claimed for the manufacture and/or composition of the polyesters per se. The production of such polyesters is well known in the art, e.g. see U.S. Pat. No. 2,901,466.

Suitable binders are those polyesters having a reduced specific viscosity (RSV value) of 0.4–1.2, preferably 0.5–0.7 dl./g. The reduced specific viscosity is determined on a 0.23% solution in a 60/40 mixture of phenol/tetrachloroethane at 25° C. using an Ostwald-type viscosimeter.

The coating compositions of the present invention can furthermore contain the customary auxiliary agents and additives known in the art, e.g. pigments, nucleating agents, etc. including but not limited to TiO$_2$, CaSO$_4$, BaSO$_4$, SiO$_2$, organic pigments, talcum, Ca—, Zn—, Al—, Ba—, Mg-salts of fatty acids etc.

To produce the coating compositions of this invention, the polyester, the flow agent of this invention, and any optional customary auxiliary agents and additives are mixed together in accordance with conventional methods. Subsequently, the mixture is melted in an extruder and granulated. The thus-obtained granules are pulverized by conventional means, e.g. at low temperatures with the use of liquid nitrogen as a coolant.

Other suitable mixing and powder manufacturing processes are described in DOS's (German Unexamined Laid-Open Applications) Nos. 2,253,361 and 2,335,876. The powders prepared according to these methods can likewise be utilized as coating agents.

The powdery coating compositions of this invention can be applied to metallic articles by means of the fluidizedbed coating, flame-spraying or electrostatic coating processes. The melting temperatures in these methods generally range from about 200° to 400°C.

The enamel coatings produced with the aid of the coating compositions of this invention show an excellent, smooth surface with good general characteristics from the viewpoint of enamel technology. The troublesome smoking encountered in using prior art flow agents occurs practically not at all during the melting process.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLES

To conduct the examples, polyesters were prepared which are set forth hereinbelow with regard to their composition, with all quantitative data in molar percent:

Table I

|  | I | II | III | IV | V |
|---|---|---|---|---|---|
| Terephthalic Acid | 40 | 50 | 40 | 70 | 70 |
| Isophthalic Acid | 50 | — | — | 20 | — |
| Hexahydroterephthalic Acid | — | 50 | 50 | — | 30 |
| Decandicarboxylic Acid | 10 | — | 10 | 10 | — |
| CHDM | 100 | 100 | 100 | 100(*) | 100(*) |
| RSV-Value (dl./g.) | 0.64 | 0.66 | 0.67 | 0.70 | 0.70 |

(*) 1,4,Butanediol 1000 parts by weight of a dried polyester of Table I is mixed in a high-speed mixer with the flow agent and optionally with TiO$_2$ as the pigment. The mixture is then processed into a homogeneous melt at 200°–220° C. in an extruder; this melt is quenched with water and then granulated. In an impact breaker mill, the granulated material is ground into a powder of a particle size of 60–315 mµ while cooling the material to be ground with liquid nitrogen.

With the thus-obtained powder, a metal coating step is conducted in accordance with the fluidized-bed coating process described in German Patent 933,019. For this purpose, a steel sheet having a thickness of 1 mm. which has been sandblasted and degreased with acetone is heated to 350° C. and dipped for 2 seconds into the fluidized bed. After the powder has melted, the thus-coated sheet is air-cooled (examples with polyesters I–III) or quenched with water (examples with polyesters IV and V). In this way, smooth and glossy coatings on the iron metal sheet are obtained having a layer thickness of about 250–300 µ.

The test data for the coating step, such as the smoking period during coating, as well as the Erichsen depression (deep drawability) according to DIN 53 156 and characteristics of the coating have been compiled in Table II. The smoking period indicated is that time during which the coated metallic element displays strong smoke development after having been removed from the fluidized bed.

The experiments denoted by letters in Table II are comparative tests.

TABLE II

| Test No. | Polyester (1000 Parts by Weight) | Flow Agent (*) | Amount (Parts by Weight) | Amount of Pigment (Parts by Weight) | Smoking Period (sec.) | Erichsen Depression (mm.) | Surface Characteristic |
|---|---|---|---|---|---|---|---|
| 1 | I | a | 10 | — | 14 | >10 | Smooth |
| 2 | II | a | 10 | — | 12 | >10 | Smooth |
| 3 | III | a | 10 | — | 16 | >10 | Smooth |
| 4 | I | a | 10 | 80 | 10 | >10 | Smooth |
| 5 | II | a | 10 | 80 | 8 | >10 | Smooth |
| 6 | III | a | 10 | 80 | 7 | >10 | Smooth |
| 7 | I | a | 15 | — | 17 | >10 | Smooth |
| 8 | I | a | 5 | — | 9 | >10 | Smooth |
| 9 | I | b | 10 | — | 11 | >10 | Smooth |
| 10 | III | c | 10 | — | 13 | >10 | Smooth |
| 11 | IV | a | 10 | — | 10 | >10 | Smooth |
| 12 | IV | b | 10 | — | 15 | >10 | Smooth |
| 13 | V | c | 10 | — | 9 | >10 | Smooth |
| A | I | — | — | — | 5 | 3.2 | Very Strong Orange Peel Effect |
| B | II | — | — | — | 7 | 6.0 | Very Strong Orange Peel Effect |
| C | III | — | — | — | 7 | 7.0 | Very Strong Orange Peel Effect |
| D | I | d | 10 | — | 60 | 4.0 | Strong Orange Peel Effect |
| E | I | e | 10 | — | 54 | 4.0 | Strong Orange Peel Effect |
| F | I | f | 10 | — | 85 | 1.2 | Weak Orange Peel Effect |
| G | I | g | 10 | — | 70 | 2.0 | Weak Orange Peel Effect |

*) Flow Agent a: 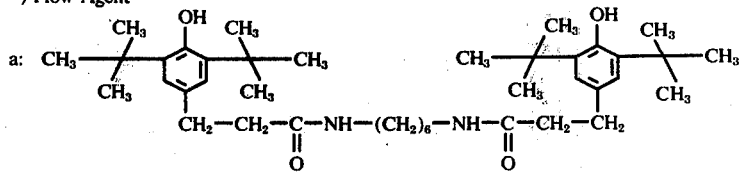

b: 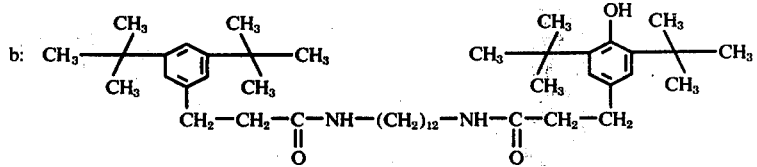

c: 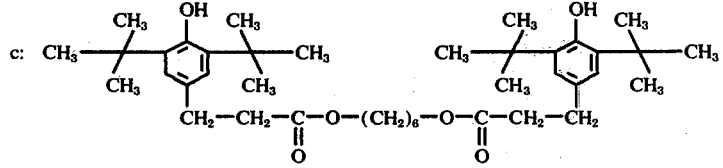

d: 2,6-Di-tert.-butyl-4-n-butylphenol
e: 3,5-Di-tert.-butyl-4-hydroxyphenylpropionic acid n-butyl ester
f: Flow agent system according to U. S. Patent 3,654,198. 1000 parts by weight of coating composition contains 50 parts by weight of a cellulose ester (butyryl content: ~ 50% by weight; acetyl content: ~ 1 % by weight) and 100 parts by weight of di(2-ethylhexyl)phthalate.
g: Commercial flow agent on the basis of a polyacrylic ester (MODAFLOW).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A powdery coating composition suitable for coating metallic surfaces at high temperatures, comprising powdery particles of a saturated, high-molecular weight thermoplastic polyester having an RSV value of about 0.4–1.2 dl./g. having homogeneously dispersed throughout said particles about 0.1–5% by weight, based on the weight of the polyester, of a flow agent of the formula

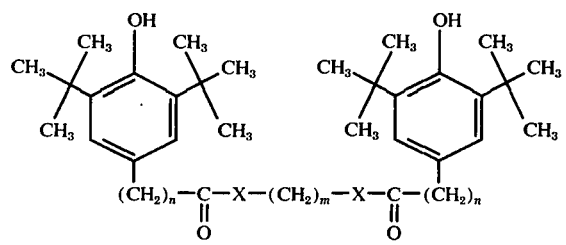

wherein
n is an integer of 0–6;
m is an integer of 2–12; and
X is oxygen or an —NH— group.

2. A powdery coating composition according to claim 1, containing about 0.5–2% by weight, based on the weight of the polyester, of said flow agent.

3. A powdery coating composition according to claim 1, wherein said flow agent is a compound of the formula

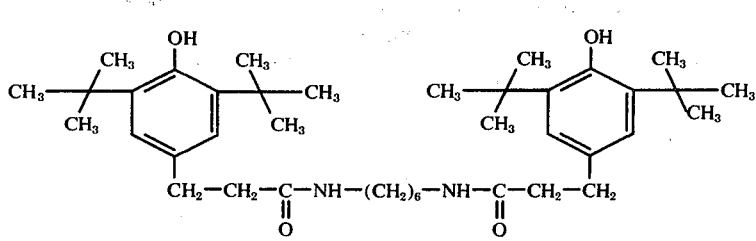

4. A powdery coating composition according to claim 1, wherein said polyester is one in which the acid component consists essentially of substantially equal parts of terephthalic acid and isophthalic acid or hexahydroterephthalic acid.

5. A powdery coating composition according to claim 4, wherein 1–10% of said terephthalic acid is replaced by decanedicarboxylic acid.

6. A powdery coating composition according to claim 4, wherein the diol portion of said polyester is predominantly 1,4-bis(hydroxymethyl)cyclohexane.

7. A powdery coating composition according to claim 6, wherein the polyester has an RSV value of 0.5–0.7 dl./g.

8. A powdery coating composition according to claim 7, containing 0.5–2% by weight of said flow agent.

9. A powdery coating composition according to claim 8, wherein said flow agent is a compound of the formula

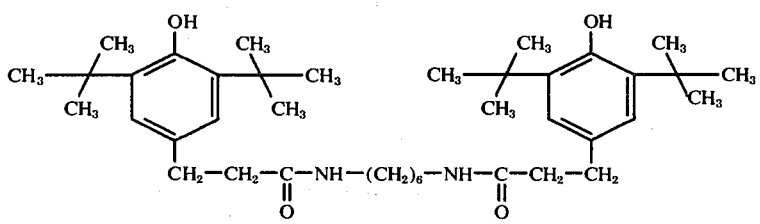

* * * * *